Patented Mar. 3, 1936

2,032,505

UNITED STATES PATENT OFFICE 2,032,505

CHRYSENEMONOSULPHONIC ACID

Albert Schmelzer, Cologne-Mulheim, Germany, assignor to General Aniline Works, Inc., New York, N. Y., a corporation of Delaware No Drawing. Application April 24, 1935, Serial No. 18,079. In Germany May 4, 1934

1 Claim. (Cl. 260—159)

The present invention relates to a new chrysenemonosulphonic acid, more particularly it relates to the chrysene-2-sulphonic acid of the probable constitution:

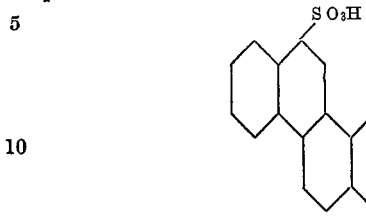

My new chrysenemonosulphonic acid is obtainable by acting upon chrysene with chlorosulphonic acid under moderate conditions and in the presence of a solvent or diluent, the conditions of working being more fully described in the examples. It is surprising that the reaction proceeds in such a smooth and uniform manner, especially in view of the fact that the similarly constituted phenanthrene on sulphonation yields at least two monosulphonic acids besides other products (compare Berichte der Deutschen Chemischen Gesellschaft, vol. 34, page 4004).

The new chrysenemonosulphonic acid is obtained in form of a white powder, soluble in sulphuric acid; it forms well-crystallizing alkali metal salts and is a valuable intermediate product in the manufacture of dyestuffs.

The invention is illustrated by the following examples, without being limited thereto:

*Example 1.*—114 grams of finely sieved chrysene are suspended in 1000 grams of acetylenetetrachloride, and thereto are added drop by drop at 2–5° C. 60 grams of chlorosulphonic acid. After this the reaction mixture is stirred for about 5 hours at the same temperature, and stirring is continued for further 15 hours at 20° C. Then ice is added to the reaction mixture and the solvent is distilled off with steam. From the concentrated aqueous solution the free acid separates in form of a white powder. When isolating the new chrysenemonosulphonic acid as alkali metal salt, the liquor resulting from the steam distillation is diluted with hot water to about 8000 cc., and after the addition of 100 cc. of aqueous caustic soda lye of 33% strength heated to boiling. The solution is rendered acid to congo with crude hydrochloric acid and filtered with suction while boiling from some unchanged chrysene. On cooling a uniform chrysenemonosodium sulphonate, probably the chrysene-2-sodium sulphonate crystallizes in a good yield. By recrystallization from water it is obtained in form of rhombic plates. In concentrated sulphuric acid it is soluble without coloration, and it yields a chrysenemonosulphochloride of the melting point 179–180° C.

*Example 2.*—114 grams of chrysene are dissolved in 1200 grams of hot nitrobenzene, and the solution is cooled to 2° C. To the suspension thus obtained 60 grams of chlorosulphonic acid are dropped at 2–5° C. The further working and separating are performed as described in Example 1. The product obtained is identical with that obtained in accordance with Example 1.

I claim:

Chrysene-2-sulphonic acid of the formula:

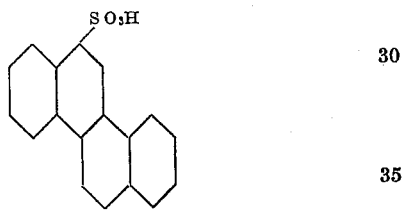

being a white powder, soluble in sulphuric acid, forming well-crystalizing akali metal salts and being a valuable intermediate product in the manufacture of dyestuffs.

ALBERT SCHMELZER.